United States Patent [19]

Childress

[11] Patent Number: 4,517,887

[45] Date of Patent: May 21, 1985

[54] TACO SHELL FRYING MOLD

[76] Inventor: J. Phillip Childress, 3712 Toll Gate Ter., Falls Church, Va. 22041

[21] Appl. No.: 528,521

[22] Filed: Sep. 1, 1983

[51] Int. Cl.³ ............................................. A47J 43/18
[52] U.S. Cl. ........................................ 99/426; 99/439
[58] Field of Search ................. 99/349, 353, 403, 426, 99/427, 432, 439, 449, 428, 450; D7/43, 47; 426/439, 497, 502, 505, 517; 425/406, 412, 458; 249/117, 122, 135, 142, 160, 175, 184; 100/116, 125, 213

[56] References Cited

U.S. PATENT DOCUMENTS

| | | | |
|---|---|---|---|
| 1,076,383 | 10/1913 | Mendez | 99/426 |
| 2,216,984 | 10/1940 | Pearson | 99/426 |
| 3,020,826 | 2/1962 | Silva | 99/426 |
| 3,308,748 | 3/1967 | Jalbert | 99/426 X |
| 3,693,537 | 9/1972 | Johnson | 99/426 |
| 3,745,911 | 7/1973 | Kennedy | 99/426 |
| 3,759,165 | 9/1973 | Wallace | 99/427 |
| 3,817,163 | 6/1974 | Kizziar et al. | 99/426 X |
| 4,154,156 | 5/1979 | Brignall | 99/426 |
| 4,173,926 | 11/1979 | Brignall | 99/426 X |
| 4,181,073 | 1/1980 | Chapa, Sr. | 99/426 X |

FOREIGN PATENT DOCUMENTS 4026 of 1901 United Kingdom ................. 99/439

Primary Examiner—Billy J. Wilhite
Attorney, Agent, or Firm—Felfe & Lynch

[57] ABSTRACT

A cooking utensil to hold and form a taco shell from a soft tortilla in a frying pan has inner and outer U-shaped, nestable mold pieces connected for sliding the base of the U of the inner mold piece into the opening of the U of the outer mold piece. A soft tortilla is placed between the slid-open mold pieces and the inner mold piece then slid inward to sandwich the tortilla between the mold pieces.

20 Claims, 3 Drawing Figures

TACO SHELL FRYING MOLD

BACKGROUND OF THE INVENTION

The invention relates to a mold for frying a taco shell.

Tacos are Mexican in origin, but have gained widespread acceptance in the United States in recent years. Whereas the tortilla for the Mexican form of taco is usually cooked flat without special utensils and folded after the ingredients are placed on the tortilla, the interest in this country has been in using crisp taco shells pre-formed for receiving a filling, usually hot meats and condiments, just prior to serving. Pre-formed, crisp taco shells are sold in stores, but are often expensive, $1 or more per dozen, and also are often found to have been broken in shipment. Soft tortillas are also available in stores, either frozen or fresh, for 50-60 cents per dozen. Taco shells made with such fresh tortillas and cooked in fresh oil generally have a much better taste than the pre-formed shells. A way to fry the soft tortillas into the crisp, pre-formed taco shells desired would thus both save money and create a fresher, higher-quality, better-tasting taco shell.

The desired form of cooked-crisp taco shell is evenly folded in half and open at the top to receive the filling. Because the tortilla becomes very limp when first placed in hot cooking oil, it will not retain this open shape without either a mold or by floating in deep fat. Whereas deep fat frying might be appropriate for restaurants, it is costly and has declined in use in households in recent years. A mold capable of forming a taco shell in very shallow oil in a normal household-sized frying pan is therefore desirable.

One problem with such molds has been clearing the sides of the frying pan with handles for the mold while keeping the mold flat against the frying pan bottom to allow minimum oil use. Prior mold constructions have tried to solve this problem with loosely connected handles or s-shaped bends in them. The former limits the control the cook has over the mold and the latter limits its location in the pan and thus the pan size.

Also, because a meal may consist of several tacos, it is desirable to reduce the time and effort necessary to perform each taco shell-frying task. Some mold constructions make it necessary to affix the tortilla with special clips or connectors which, after a first taco shell has been cooked, are hot and tend to burn the cook's fingers when touched to insert another tortilla. A better way to open and close a mold to insert a soft tortilla or to retrieve a finished taco shell is therefore desirable for convenience and safety.

SUMMARY OF THE INVENTION

To these ends, the invention provides U-shaped, nestable inner and outer mold pieces which are slidably connected to open to receive a tortilla and then, upon sliding into the nested position, hold the tortilla sandwiched therebetween for frying.

Preferably, the inner U-shaped mold piece has a shorter handle which is slidably connected to a longer handle on the outer U-shaped mold piece by a small C-shaped clip. The clip is part of or permanently welded or otherwise affixed to the shorter handle but can be slid off the end of the longer handle to make the two mold pieces easily separable for cleaning. The handles and mold pieces are preferably formed from sheet metal, the mold piece portions of which are discs slightly larger in diameter than the tortillas to be processed with holes or slots punched through them to allow oil to flow to the tortilla and, if the handles are separate, with an extension or projection on one side of the discs to permit attachment of the handles by welding or riveting.

Preferably, too, the handles are rigidly connected to the U-shaped mold pieces, for firm control of the mold, at an inwardly oblique angle and the U of the mold pieces divergent. These angles permit the utensil, when filled with a tortilla and closed, to be placed in the frying pan in such a way that either flat side of the mold piece U's can lie flat against the frying pan bottom and the tortilla thus covered with oil even if the oil is relatively shallow, while at the same time the handles clear the frying pan edge or rim.

DESCRIPTION OF THE DRAWINGS

A preferred embodiment which is intended to illustrate but not limit the invention will now be described with reference to drawings in which.

DESCRIPTION OF THE PREFERRED EMBODIMENT

Figure 1:
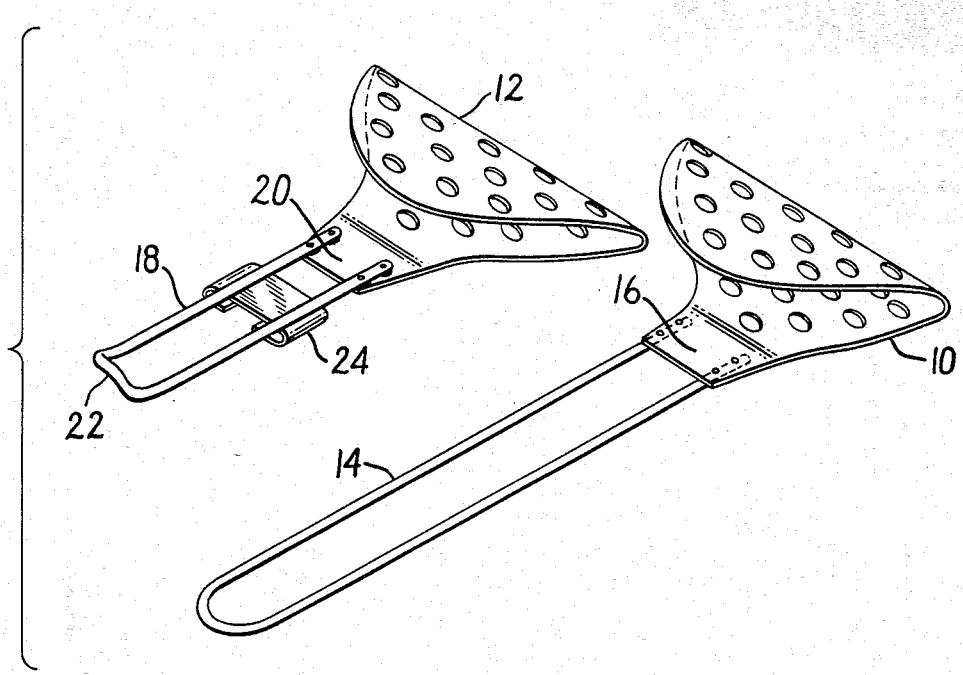
FIG. 1 is an exploded, perspective view of the preferred embodiment.

As shown in FIG. 1, a taco shell frying mold comprises an outer U-shaped mold piece 10 and an inner U-shaped mold piece 12 dimensioned for nesting in the outer mold piece with a tortilla (not shown) sandwiched therebetween. Each mold piece is made of apertured sheet metal to provide access to the tortilla for cooking oil.

A handle 14 fixedly extends from a fastening platform 16 projecting from an end of the U of the outer mold piece i.e., from a center portion of a rim formed by one of the upper sides of the U. The handle 14 is a wire U connected at its open end to the outer side of the fastening platform to conduct a minimum of heat and be out of the way of the tortilla to be placed in U of the outer mold piece. Also, the handle 14 projects transversely to the base of the U of the outer mold piece.

A similar handle 18 similarly fixedly extends from a fastening platform 20 of the inner mold piece, except that it is fixed to the inner side of the fastening platform, again to be out of the way of the tortilla which will be on the outer side of the inner mold piece when sandwiched in the nested mold pieces. The handle 18 is also bent up at its U end 22 for sliding manipulation.

A C-shaped clip 24 is secured to the handle 18 with the ends of the C positioned to wrap about the handle 14 for slidably connecting the handles with the mold pieces nestable upon relatively sliding the handles along a straight line so that the bases of the mold pieces remain parallel.

Figure 2:
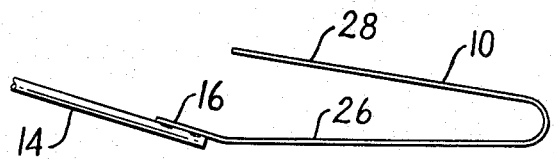
FIG. 2 is an elevation of one portion of the preferred embodiment.
Figure 3:
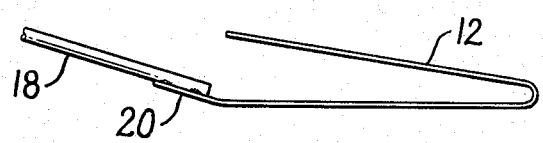
FIG. 3 is an elevation of another portion of the preferred embodiment.

FIG. 2 shows an elevation of the outer mold piece 10 and a portion of its handle 14 and FIG. 3 shows an elevation of the inner mold piece 12 and a portion of its handle 18. In these views, it is seen that the U's of the mold pieces 10, 12 diverge somewhat, and that the handles 14, 18 are at inwardly oblique angles to the sides of the U's to which they are connected via the fastening platforms 16, 20.

In use, the clip 24 is slipped onto the end of handle 14 and a tortilla placed between the mold pieces. The inner mold piece is then slid along handle 14 so that the base of its U moves toward the base of and enters the open end of the U of the outer mold piece with the tortilla sandwiched between the mold pieces. The bent up end 22 of the handle 18 is conveniently used for this, especially after the mold pieces are hot from prior use.

The inwardly oblique angle of the outer handle then serves to raise the handles to clear the edge of a frying pan so that the lower side 26 of the outer mold piece can be placed flat on the bottom of the pan. This allows the adjacent side of the tortilla sandwiched between the mold pieces to be fried in a minimum depth of oil.

The inwardly oblique angle of the handle 18 of the inner mold piece 12 is somewhat smaller than that of the handle 14 (and the corresponding outer acute angle as shown in FIGS. 2 and 3 thus larger). This tilts the inner mold piece in the outer to provide space for the thickness of the tortilla even through the handles 14, 18 are slidably clipped together in parallel.

The sides of the U's of the inner and outer mold pieces are slightly divergent so that the spacing of the ends of the U of the outer mold piece is somewhat greater than the height of the edge of the frying pan with which the mold is used. In this way, the upper side 28 of the outer mold piece can also be lain flat in the bottom of the frying pan for frying the other side of the tortilla in the minimum of oil, the handle 14 then projecting downwardly over the edge of the frying pan.

The combination of the inward oblique angles of the handles and the divergence of the U's of the mold pieces thus allows both sides of the tortilla to be fried flat on the bottom of a frying pan, and thus with a minimum of oil and with variable space from the edge of the frying pan, so that the size of the pan needed is not as rigidly prescribed by the mold as when the handle is S shaped for clearing the edge of the pan. With the handles fixed to the mold pieces, better control of the mold and cooking is also achieved.

In an alternative embodiment (not shown) which is the best mode now contemplated by the inventor the handles and clip are an extension of the respective mold pieces from which the handles project. Illustration of this embodiment is not required because the functional shape of the handles and clip are the same as those shown, the web of sheet metal filling in the U's of the handles stiffening them, but otherwise being non-functional relative to the invention.

It will be understood that the specification and examples are illustrative but not limitative of the present invention and that other embodiments within the spirit and scope of the invention will suggest themselves to those skilled in the art.

What is claimed is:

1. In a toco shell frying mold having inner and outer U-shaped pieces configured for nesting the U of the inner mold piece in the U of the outer mold piece with the bases of the mold pieces parallel whereby to sandwich a tortilla for frying into the taco shell therebetween, the improvement comprising:
    a first handle projecting from the center portion of a rim formed by one of the upper sides of the U of the outer mold piece; and
    connection means slidably connecting the inner mold piece to the first handle for sliding the base of the U of the inner mold piece away from and toward the base of the U of the outer mold piece along a straight line such that the bases remain parallel, whereby to open the mold pieces for receiving the tortilla therebetween and nesting the mold pieces with the tortilla sandwiched therebetween.

2. The taco shell frying mold of claim 1, wherein the connection means comprises a second handle projecting from the inner mold piece and means for sliding connection between the handles.

3. The taco shell frying mold of claim 2 wherein the handles extend in parallel transversely to the bases of the mold pieces and the means for sliding connection between the handles comprises a C-shaped clip on one handle and slidably embracing the other in the C thereof.

4. The taco shell frying mold of claim 3, wherein the first handle projects from the outer mold piece at a fixed, inwardly oblique angle to the side of the U of the outer mold piece from which it projects, whereby to clear the edge of a frying pan while lying the connected side of the U flat therein for frying one side of the tortilla in a minimum of oil.

5. The taco shell frying mold of claim 4 wherein the sides of the U's of the mold pieces diverge from the bases thereof at an angle, whereby the ends thereof may be spaced sufficiently for the first handle to clear the edge of a frying pan when the side of the outer mold piece to which the first handle is not connected is flat therein for frying the corresponding side of the tortilla in a minimum of oil.

6. The taco shell frying mold of claim 5, wherein each handle is a U-shaped wire.

7. The taco shell frying mold of claim 6, wherein each mold piece additionally comprises a fastening platform extending from one end of the U thereof to which the handle is connected at the inwardly oblique angle for connecting the handle thereto.

8. The taco shell frying mold of claim 5, wherein each handle is a U-shaped extension of the mold piece from which it projects.

9. The taco shell frying mold of claim 4, wherein the first handle is a U-shaped wire.

10. The taco shell frying mold of claim 9, wherein each mold piece additionally comprises a fastening platform extending from the end of the U thereof to which the handle is connected at the inwardly oblique angle for connecting the handle thereto.

11. The taco shell frying mold of claim 4, wherein each handle is a U-shaped extension of the mold piece from which it projects.

12. The taco shell frying mold of claim 3, wherein each handle is a U-shaped wire.

13. The taco shell frying mold of claim 3, wherein each handle is a U-shaped extension of the mold piece from which it projects.

14. The taco shell frying mold of claim 2, wherein the first handle projects from the outer mold piece at a fixed, inwardly oblique angle to the side of the U of the outer mold piece from which it projects, whereby to clear the edge of a frying pan while lying the connected side of the U flat therein for frying one side of the tortilla in a minimum of oil.

15. The taco shell frying mold of claim 14 wherein the sides of the U's of the mold pieces diverge from the bases thereof at an angle, whereby the ends thereof may be spaced sufficiently for the first handle to clear the edge of a frying pan when the side of the outer mold piece to which the first handle is not connected is flat therein for frying the corresponding side of the tortilla in a minimum of oil.

16. The taco shell frying mold of claim 1, wherein the first handle projects from the outer mold piece at a fixed, inwardly oblique angle to the side of the U of the outer mold piece from which it projects, whereby to clear the edge of a frying pan while lying the connected side of the U flat therein for varying one side of the tortilla in a minimum of oil.

17. The taco shell frying mold of claim 16 wherein the sides of the U's of the mold pieces diverge from the bases thereof at an angle, whereby the ends thereof may be spaced sufficiently for the first handle to clear the edge of a frying pan when the side of the outer mold piece to which the first handle is not connected is flat therein for frying the corresponding side of the tortilla in a minimum of oil.

18. The taco shell frying mold of claim 1, wherein the first handle is a U-shaped wire.

19. The taco shell frying mold of claim 18, wherein the outer mold piece additionally comprises a fastening platform extending from the end of the U thereof to which the first handle is connected at the inwardly oblique angle for connecting the first handle thereto.

20. The taco shell frying mold of claim 1, wherein the first handle is a U-shaped extension of the mold piece from which it projects.

* * * * *